(12) United States Patent
Kim et al.

(10) Patent No.: US 11,353,108 B2
(45) Date of Patent: Jun. 7, 2022

(54) MANUAL SHIFT LEVER SYSTEM

(71) Applicant: KYUNG CHANG INDUSTRIAL CO., Ltd., Daegu (KR)

(72) Inventors: Jin Bo Kim, Daegu (KR); Young Geun Kim, Daegu (KR)

(73) Assignee: KYUNG CHANG INDUSTRIAL CO., Ltd., Daegu (KR)

( * ) Notice: Subject to any disclaimer, the term of this patent is extended or adjusted under 35 U.S.C. 154(b) by 466 days.

(21) Appl. No.: 16/424,756

(22) Filed: May 29, 2019

(65) Prior Publication Data

US 2019/0383388 A1 Dec. 19, 2019

(30) Foreign Application Priority Data

Jun. 18, 2018 (KR) .................... 10-2018-0069520

(51) Int. Cl.
| | | |
|---|---|---|
| *F16H 61/22* | (2006.01) | |
| *F16H 59/04* | (2006.01) | |
| *F16H 61/16* | (2006.01) | |
| *F16H 59/44* | (2006.01) | |

(52) U.S. Cl.
CPC ............. *F16H 61/22* (2013.01); *F16H 59/04* (2013.01); *F16H 61/16* (2013.01); *F16H 59/44* (2013.01); *F16H 2061/166* (2013.01); *F16H 2061/223* (2013.01)

(58) Field of Classification Search
CPC .......... F16H 61/22; F16H 59/04; F16H 61/16; F16H 59/44; F16H 2061/166; F16H 2061/223; F16H 59/0278; F16H 2059/0282
See application file for complete search history.

(56) References Cited

U.S. PATENT DOCUMENTS

| | | |
|---|---|---|
| 10,088,041 B2 | 10/2018 | Kim |
| 2016/0223076 A1* | 8/2016 | Kim ....................... F16H 61/16 |
| 2017/0102069 A1 | 4/2017 | Kim |

FOREIGN PATENT DOCUMENTS

| | | |
|---|---|---|
| CN | 106838297 A | 6/2017 |
| JP | 2009-046095 A | 3/2009 |
| KR | 101356145 B1 | 1/2014 |

OTHER PUBLICATIONS

China National Intellectual Property Administration, Office Action, CN Patent Application No. 201910528757.0, dated Jul. 14, 2020, 12 pages.

* cited by examiner

*Primary Examiner* — Victor L MacArthur
(74) *Attorney, Agent, or Firm* — Fenwick & West LLP

(57) ABSTRACT

A manual shift lever system may be provided that includes: a shift lever which includes a rod and a stopper formed on the rod; a shift lock unit which limits a movement of the rod; and a control unit which, when a speed of a vehicle is greater than a critical speed of a predetermined gear limits the movement of the rod in a shift direction of the predetermined gear. The shift lock unit includes: at least one shift lock cam part including a main cam, a sub-cam, a shaft which functions as a rotating shaft of the main cam and the sub-cam, and a spring which connects the main cam and the sub-cam; a permanent magnet which is connected to the shift lock cam part; and an electromagnet arranged to have a polarity arrangement opposite to that of the permanent magnet.

11 Claims, 8 Drawing Sheets

FIG. 6
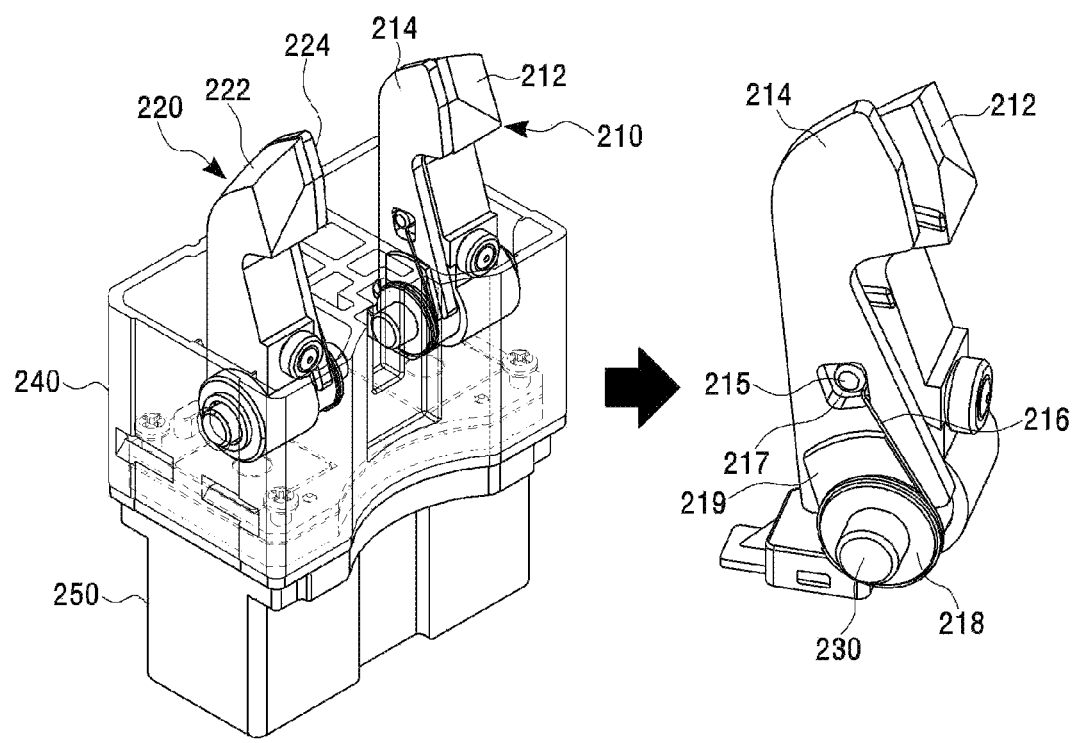
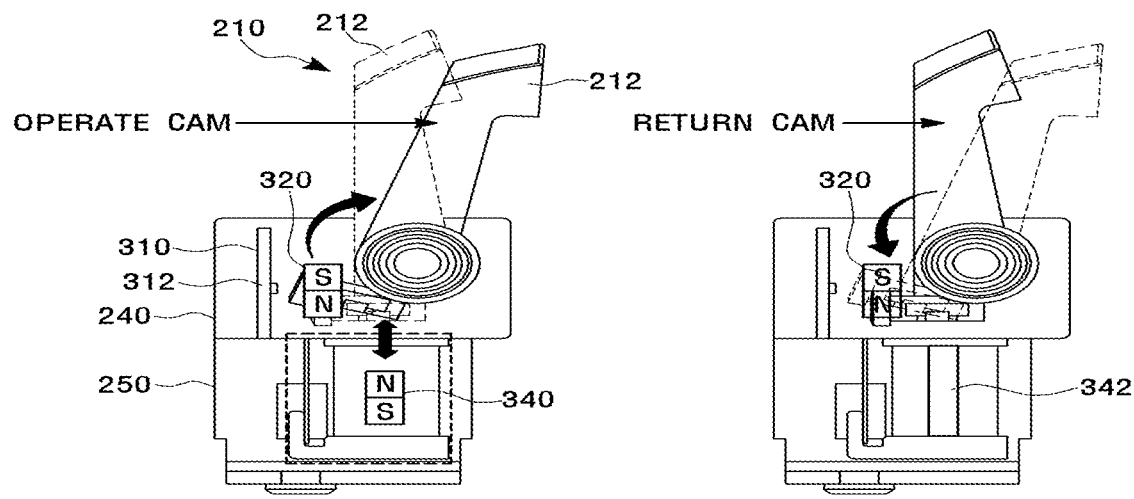
FIG. 7A
FIG. 7B

MANUAL SHIFT LEVER SYSTEM

CROSS-REFERENCE TO RELATED APPLICATIONS

This application claims priority from Republic of Korea Patent Application No. 10-2018-0069520 filed on Jun. 18, 2018, which is incorporated by reference in its entirety.

BACKGROUND

Field

The present disclosure relates to a manual shift lever system.

Description of the Related Art

A transmission is installed between a clutch and a propeller shaft and functions to transfer the power of the engine to the drive wheels by increasing or decreasing the rotational force of the engine in accordance with the driving state of a vehicle.

The engine of the vehicle has its constant rotation direction and the torque which is generated in the engine is almost constant within a practical rotational speed range, whereas the driving condition of the vehicle varies widely such as starting from a stopped state, high speed driving from low speed driving, particularly, reverse driving, etc. Therefore, the transmission is used to allow the engine to sufficiently show its performance in response with each of the driving conditions.

The transmission has various types including a manual transmission, an automatic transmission, a semi-automatic transmission, a continuously variable transmission, etc.

By the operation of a driver, the manual transmission among the above-described various transmissions changes a shift ratio, reverses a rotation direction, and creates a state where no power is transferred. The manual transmission consumes less fuel and has less power loss as compared with the automatic transmission.

The driver shifts a gear of the transmission manually. Hence, the driver may shift to a lower gear, for example, to the first gear or the second gear intentionally or by mistake even though the vehicle is driven at a high speed. In this case, overload is added to the manual transmission, and thus, the manual transmission may be damaged. In other words, when the driver, who travels at a high speed, shifts to a lower gear such as the first gear or the second gear in the manual transmission, the overload occurs. Therefore, it was necessary to limit shifting to a lower gear in the manual transmission when the driver travels at a high speed. FIG. 1 shows an example of a conventional manual transmission.

Referring to FIG. 1, the movement of a shift lever 5 is limited by a shift lock cam 3. A stopper 19 is formed on the shift lever 5. A solenoid actuator 7 is connected to the shift lock cam 3 via a shaft 17. Since the shaft 17 is exposed to the outside and is operated, the shaft 17 cannot be protected from external contaminants. Also, in the conventional manual transmission, noise is generated due to the operation of the solenoid actuator 7.

As such, in the conventional manual transmission, since the shaft 17, i.e., the connection portion of the shift lock cam 3, is exposed to the outside and is operated, the solenoid actuator 7 is easily contaminated by contaminants such as moisture from the outside, etc. Also, loud noise is generated due to the operation of the solenoid actuator 7.

SUMMARY

One embodiment is a manual shift lever system that includes: a shift lever which includes a rod and a stopper formed on the rod; a shift lock unit which limits a movement of the rod; and a control unit which, when a speed of a vehicle is greater than a critical speed of a predetermined gear by comparing the speed of the vehicle with the critical speed, limits the movement of the rod in a shift direction of the predetermined gear by positioning the shift lock unit on a shift path of the predetermined gear. The shift lock unit includes: at least one shift lock cam part including a main cam which is engaged with the stopper of the shift lever during the operation thereof, a sub-cam which is disposed adjacent to the main cam, a shaft which functions as a rotating shaft of the main cam and the sub-cam, and a spring which connects the main cam and the sub-cam; a permanent magnet which is connected to the shift lock cam part; and an electromagnet which is disposed adjacent to the permanent magnet and is arranged to have a polarity arrangement opposite to that of the permanent magnet.

The sub-cam may have a thickness smaller than that of the main cam.

The main cam may have a protrusion formed on a side thereof, and the sub-cam may have an opening for receiving the protrusion.

The shift lock cam part may further include a spring support on which the spring is wound and which is coupled to the sub-cam, and one end of the spring may be connected to the protrusion of the main cam and the other end of the spring may be wound on the spring support coupled to the sub-cam.

The shift lock unit may further include a sensor which senses a position of the main cam, and the sensor may transmit information on the sensed position of the main cam to the control unit.

The shift lock unit may further include a housing which seals the electromagnet.

The shift lock unit may further include a fixing portion for fixing the shaft.

BRIEF DESCRIPTION OF THE DRAWINGS

FIG. 6 is a perspective view of a cam of a shift lock unit according to an embodiment of the present disclosure;

FIGS. 7A and 7B are views showing the internal configuration of the shift lock unit according to an embodiment of the present disclosure.

DETAILED DESCRIPTION

An embodiment of the present disclosure will be described in detail with reference to the accompanying drawings. In the components of the present disclosure, detailed descriptions of what can be clearly understood and easily carried into practice through a prior art by those skilled in the art will be omitted to avoid making the subject matter of the present invention unclear.

Embodiment

Figure 2:
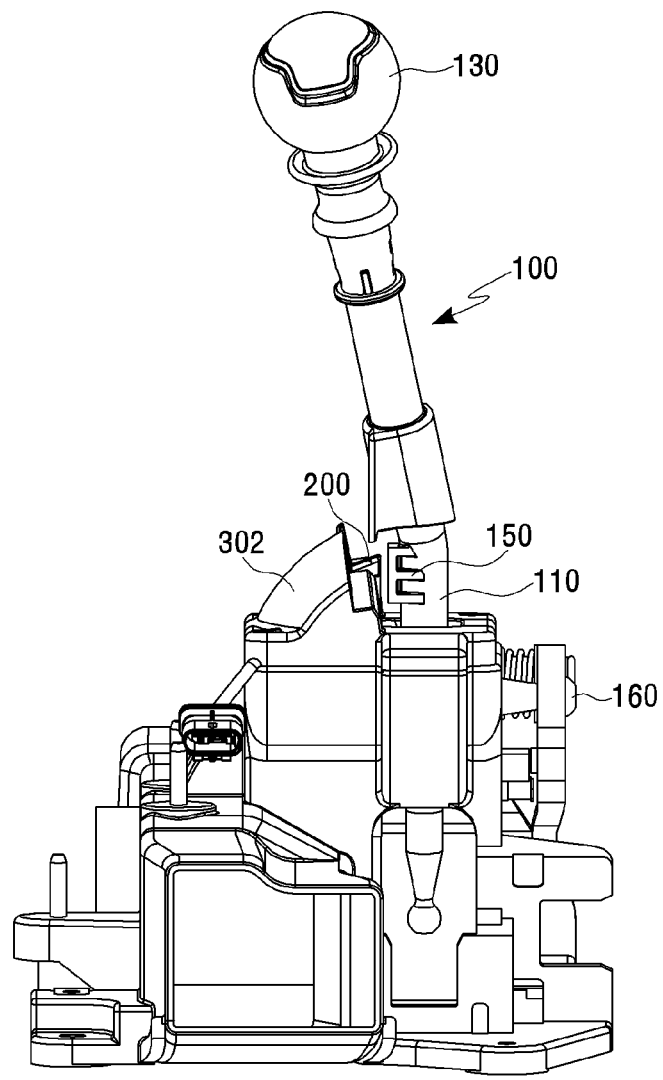
FIG. 2 is a perspective view of a manual shift lever system according to an embodiment of the present disclosure.
Figure 3:
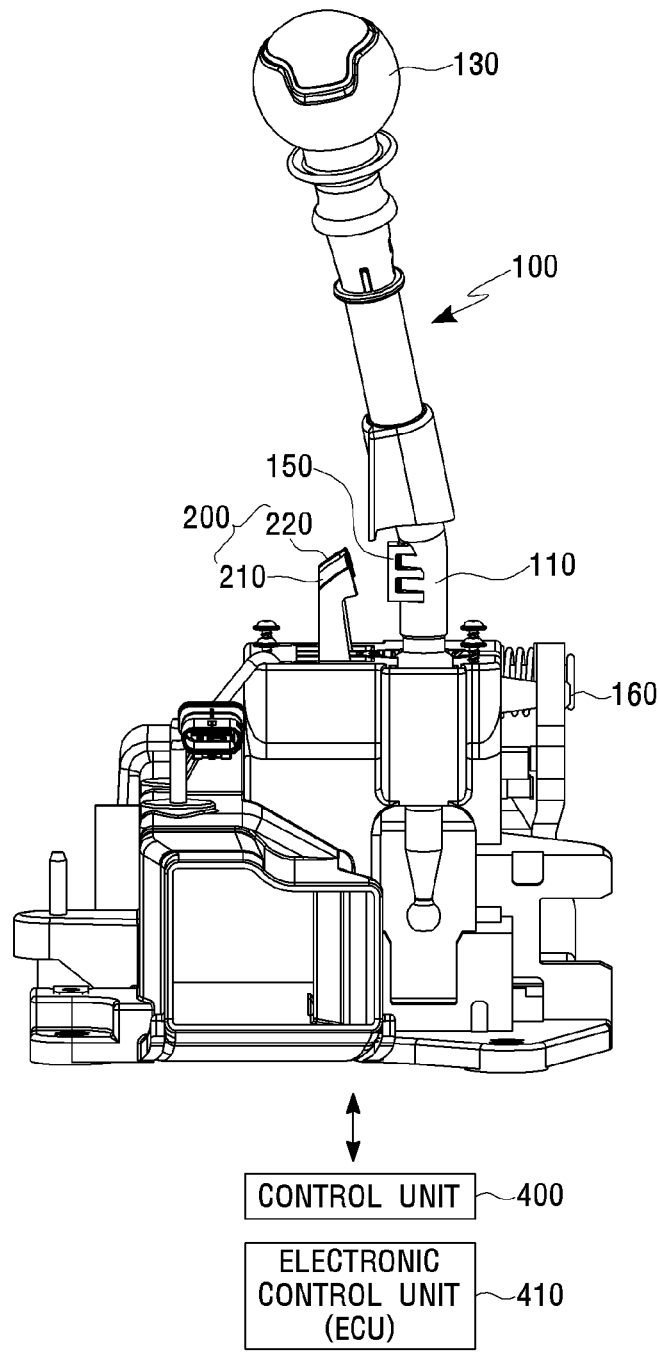
FIG. 3 is a perspective view showing the manual shift lever system of FIG. 2 without a portion of the configuration thereof according to an embodiment of the present disclosure.
Figure 4:
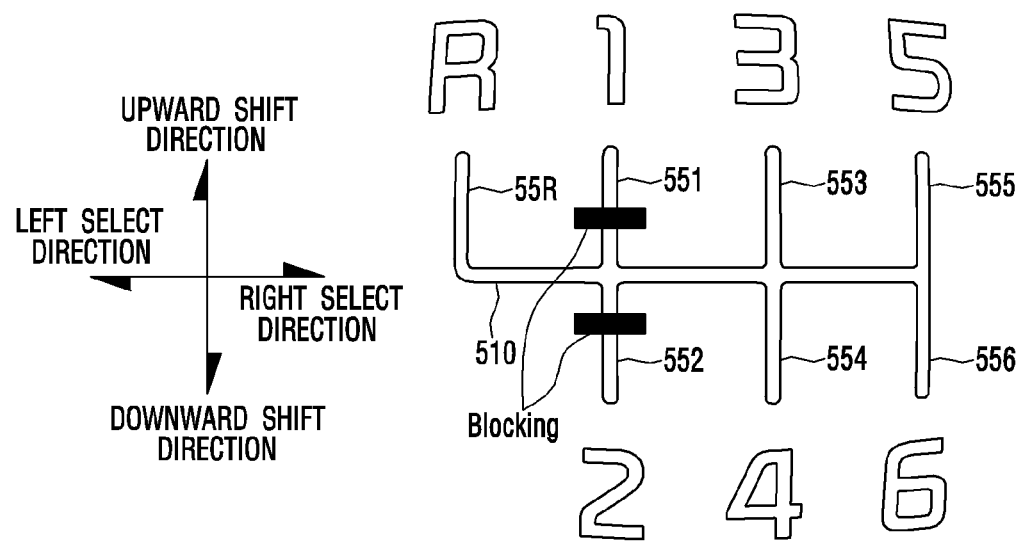
FIG. 4 is a view showing a shift pattern of a gear of the manual shift lever system of FIG. 2 to an embodiment of the present disclosure.

FIG. 2 is a perspective view of a manual shift lever system according to an embodiment of the present disclosure. FIG. 3 is a perspective view showing the manual shift lever system of FIG. 2 without a portion of the configuration thereof. FIG. 4 is a view showing a shift pattern of a gear of the manual shift lever system of FIG. 2.

Referring to FIGS. 2 and 3, the manual shift lever system according to the embodiment of the present disclosure includes a shift lever 100 which includes a rod 110, a shift lock unit 200 which limits the movement of the rod 110, and a control unit 400 which controls the shift lock unit 200. Also, the manual shift lever system may further include an electronic control unit (ECU) 410 for controlling the control unit 400.

The rod 110 moves along the shift pattern of a driver. The shift pattern shown in FIG. 4 may be engraved or embossed in a knob 130 of the shift lever 100 shown in FIG. 2. The shift pattern corresponds to a plurality of gears.

In the present specification, a "predetermined gear" means any one of the first to n-th gears of the manual transmission (here, n is a natural number greater than 1). Here, n may be determined according to the kind of the manual transmission.

The manual shift lever system according to the embodiment of the present disclosure may include first to sixth forward gears and one reverse gear (R). The predetermined gear will be described in more detail with reference to FIG. 4.

The shift pattern may include one select pattern 510 and a plurality of shift patterns 551, 552, 553, 554, 555, 556, and 55R.

The reverse gear (R), the first gear, the third gear, and the fifth gear are disposed above the select pattern 510. The second gear, the fourth gear, and the sixth gear are disposed below the select pattern 510. The first, third, and fifth gears are disposed symmetrically with the second, fourth, and sixth gears, respectively with respect to the select pattern 510. A neutral gear position may be disposed on the select pattern 510 between the third gear and the fourth gear.

In order to shift the rod 110 located at the neutral gear position to the first gear, the rod 110 is moved along the select pattern 510 in a left select direction, and then should be moved along the shift pattern 551 corresponding to the first gear in an upward shift direction.

In order to shift to a low speed gear (the first gear or the second gear) while a vehicle is driven at a high speed, for example, the rod 110 is located at a high speed position (any one of the fourth to sixth gears), it is required that the rod 110 should be moved to the neutral gear position and moved along the select pattern 510 in the left select direction, and then should be moved along the shift pattern 551 or 552 in the upward shift direction or in a downward shift direction.

As such, the rod 110 should be moved along a "predetermined path" so as to shift to a predetermined gear. The "predetermined path" includes at least one "select path" and at least one "shift path". In the present specification, the "select path" means a trace of the rod 110 moving along the select pattern 510, and the "shift path" means a trace of the rod 110 moving along any one of the plurality of shift patterns 551, 552, 553, 554, 555, 556, and 55R.

Meanwhile, in the present specification, a "critical speed" means a speed corresponding to each of the "predetermined gears." The critical speed may be variously set by automobile manufacturers or designers. For example, the critical speed of the first gear may be set to 15 km/h, and the critical speed of the second gear may be set to 30 km/h.

Referring back to FIGS. 2 and 3, the control unit 400 compares the speed of the vehicle with a critical speed of the predetermined gear. As a result of the comparison, if the speed of the vehicle is greater than the critical speed, the control unit 400 positions the shift lock unit 200 on the shift path of the predetermined gear, thereby limiting the movement of the rod 110 in the shift direction of the predetermined gear.

According to the manual shift lever system of the manual transmission according to the embodiment of the present disclosure, when the speed of the vehicle is greater than the critical speed of the predetermined gear at a point of time of the shift-down, it is possible to prevent the shift-down and to reduce the overload of the manual shift lever system.

Hereinafter, the configuration and operation of the manual shift lever system will be described with reference to FIGS. 5A and 5B.

Figure 5A:
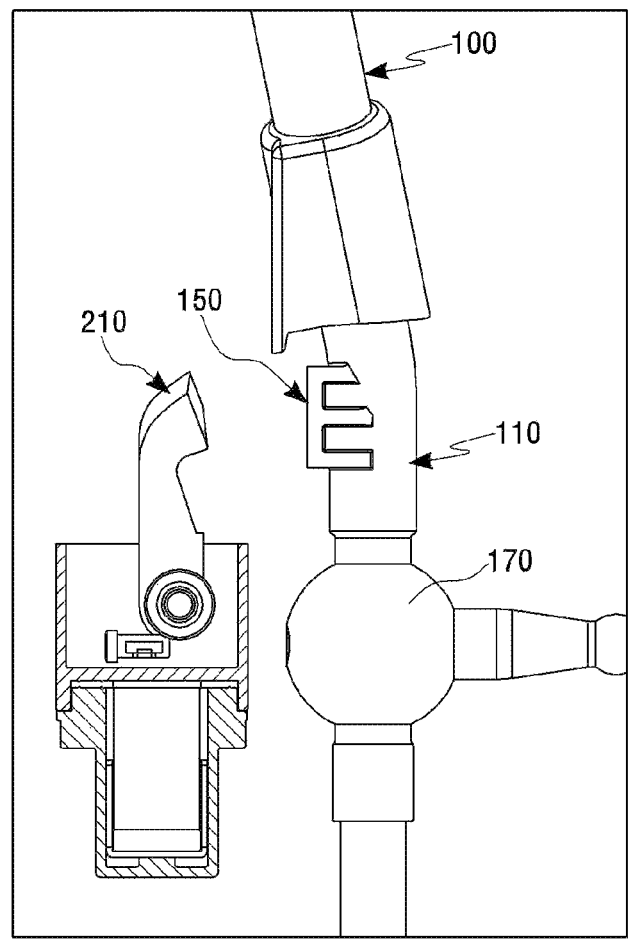
FIG. 5A is a view showing the configuration of the manual shift lever system according to the embodiment of the present disclosure.
Figure 5B:
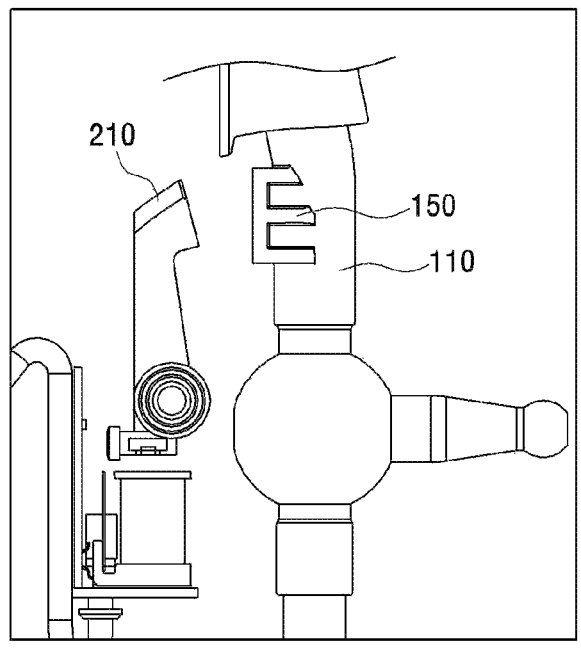
FIG. 5B is a view for describing the operation of the manual shift lever system of FIG. 5A according to an embodiment of the present disclosure.
Figure 5B:
Figure 5B:
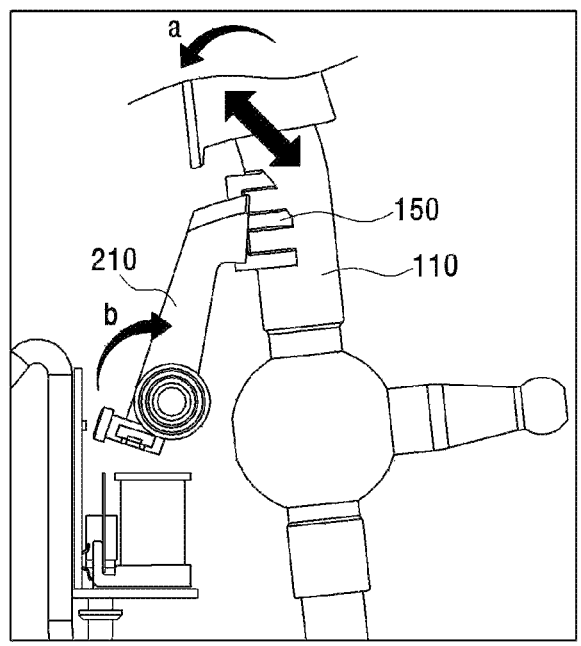

FIG. 5A is a view showing the configuration of the manual shift lever system according to the embodiment of the present invention, and FIG. 5B is a view for describing the operation of the manual shift lever system of FIG. 5A.

Referring to FIGS. 3 and 5A, the shift lever 100 may include the rod 110, the knob 130, a stopper 150, and an insert outer 170.

The rod 110 is used to shift the gear. The rod 110 can be moved along the shift pattern shown in FIG. 4 by the driver.

The knob 130 is provided on the top of the rod 110. The shift pattern shown in FIG. 4 may be formed in the knob 130. Between the knob 130 and the insert outer 170, the stopper 150 is formed on the rod 110. For example, the stopper 150 may be formed at a position where the rod 110 is engaged with the shift lock unit 200 when the driver performs the shifting.

The insert outer 170 is mounted under the rod 110. The insert outer 170 has a spherical shape allowing the insert outer 170 to rotate by the operation of the rod 110. The insert outer 170 is also connected to a select lever 900.

The shift lock unit 200 may limit or block of the movement of the rod 110 in the shift direction of the predetermined gear by the control of the control unit 400.

The shift lock unit 200 may be disposed adjacent to the shift lever 100. Specifically, the shift lock unit 200 may be disposed below the shift lever 100. As such, since the shift lock unit 200 is disposed adjacent to the shift lever 100, spatial degrees of freedom are improved.

When gear shifting is performed, the rod 110 moves around the insert outer 170 in a right and left select direction or in an up and down shift direction.

When the vehicle travels at a high speed, the driver operates the shift lever 100 in the direction of the first or second forward gear, the movement of the rod 110 can be blocked by the shift lock unit 200.

Referring to FIG. 5B, when the shift lever 100 is operated in the direction of the first or second forward gear, the movement of the rod 110 is prevented by shift lock cam parts 210 and 220 of the shift lock unit 200. In other words, when the rod 110 is moved in the direction of the first or second forward gear, that is, in a direction "a", the shift lock cam parts 210 and 220 of the shift lock unit 200 is moved by the control unit 400 in a direction opposite to the moving direction of the rod 110, that is, in a direction "b". Accordingly, the stopper 150 is caught by the contact with the shift lock unit 200, and the movement of the rod 110 in the shift direction of the first or second gear is limited.

Here, the stopper 150 is not necessary. That is, as long as a portion of the rod 110 can function as the stopper 150, the stopper 150 may not be required. In this case, the rod 110 is caught by the shift lock unit 200, and thus, the movement of the rod 110 in the shift direction of the predetermined gear may be limited. Specifically, the stopper 150 may be a portion of the rod 110 without being mounted on the rod 110.

The insert outer 170 is mounted under the rod 110. The insert outer 170 has a spherical shape allowing the insert outer 170 to rotate by the operation of the rod 110.

The shift lock unit 200 may limit or block of the movement of the rod 110 in the shift direction of the predetermined gear by the control of the control unit 400. The structure of the shift lock unit 200 will be described in detail with reference to FIG. 6.

FIG. 6 is a perspective view of a cam of the shift lock unit. FIG. 7 is a view showing the internal configuration of the shift lock unit.

Referring to FIGS. 6 and 7A and 7B, the shift lock unit 200 includes a plurality of the shift lock cam parts 210 and 220. According to another embodiment, the shift lock unit 200 may include one shift lock cam part.

Referring to FIG. 6, each of the plurality of shift lock cam parts 210 and 220 has the same configuration. That is, the shift lock cam parts 210 and 220 include main cams 212 and 222, sub-cams 214 and 224, and a shaft 230 functioning as a rotating shaft of the main cams 212 and 222 and the sub-cams 214 and 224. The following description will focus on the one shift lock cam part 210 of these shift lock cam parts 210 and 220.

The shift lock cam part 210 may include the main cam 212, the sub-cam 214, and the shaft 230 which is the rotating shaft of the main cam 212 and the sub-cam 214. The main cam 212 and the sub-cam 214 can rotate about the shaft 230. The main cam 212 is configured to engage with the stopper 150 of the shift lever 100 during the operation thereof.

The sub-cam 214 is disposed side by side with the main cam 212. The sub-cam 214 has a shape similar to that of the main cam 212, and has a thickness smaller than that of the main cam 212.

Further, the shift lock cam part 210 is configured such that the sub-cam 214 is interlocked with the main cam 212. That is, when the main cam 212 is moved, the sub-cam 214 moves depending on the movement of the main cam 212.

To this end, the shift lock cam part 210 includes a spring 216 and a spring support 218. The spring 216 connects the main cam 212 and the sub-cam 214. The spring 216 is wound on the spring support 218. The spring support 218 is disposed on the lower portion of the sub-cam 214 and is coupled to the sub-cam 214. The main cam 212 also has a protrusion 215 formed on the side thereof. The sub-cam 214 includes an opening 217 for receiving the protrusion 215 of the main cam 212.

The main cam 212 and the sub-cam 214 are disposed such that the protrusion 215 of the main cam 212 is received in the opening 217 of the sub-cam 214. In order that the sub-cam 214 is interlocked with the movement of the main cam 212, one end of the spring 216 is connected to the protrusion of the main cam 212 and the other end of the spring 216 is wound on the spring support 218 coupled to the sub-cam 214.

The spring support 218 also includes a guide 219 for guiding the spring 216. The guide 219 is formed to support the spring 216 when the spring 216 connecting the protrusion of the main cam 212 and the spring support 218 coupled to the sub-cam 214 is pulled. For example, the guide 219 may be formed to protrude from the sub-cam 214 so as to support the spring 216 along a path connecting the main cam 212 and the spring support 218.

One end of the spring 216 is connected to the protrusion 215 protruding from the side of the main cam 212, and the other end of the spring 216 is wound on the spring support 218 disposed on the lower portion of the sub-cam 214. The spring support 218 is mounted on the shaft 230.

When the spring 216 connected to the protrusion of the main cam 212 is pulled by the movement of the main cam 212, the guide 219 supports the spring 216.

Accordingly, the spring 216 connected to the spring support 218 is pulled in accordance with the rotation of the main cam 212 to move the sub-cam 214. That is, the movement of the main cam 212 is transmitted to the sub-cam 214 by the spring 216, and the sub-cam 214 is moved in the direction in which the main cam 212 moves.

Also, the shift lock unit 200 includes a fixing portion 240 for fixing the shaft 230, a permanent magnet 320 connected to the shaft 230, an electromagnet 340 disposed adjacent to the permanent magnet 320, and a housing 250 for receiving the electromagnet 340. Since the housing 250 seals the electromagnet 340, external contaminants can be prevented from being introduced.

The electromagnet 340 forms a magnetic field while current flows. Specifically, the permanent magnet 320 is connected to the main cam 212 such that one polarity of N pole and S pole is directed toward the housing 250. In addition, the electromagnet 340 is magnetized when the current flows, and the electromagnet 340 is not magnetized unless the current flows. When the current flows through the electromagnet 340, the electromagnet 340 is arranged such that a polarity opposite to the permanent magnet 320 is the same as the polarity arranged toward the housing 250 of the permanent magnet 320. That is, the electromagnet 340 is arranged so as to have a polarity arrangement opposite to that of the permanent magnet 320.

The main cam 212 is actuated by the electromagnet 340. Referring to FIGS. 7A and 7B, the control unit 400 compares the speed of the vehicle with a critical speed of the predetermined gear. As a result of the comparison, if the speed of the vehicle is greater than the critical speed, the control unit 400 turns on the power of the electromagnet 340. Then, the current flows through the electromagnet 340. When the current flows through the electromagnet 340, the electromagnet 340 becomes magnetized. Here, since the polarity of the electromagnet 340 which is opposite to the permanent magnet 320 is the same as the polarity of the permanent magnet 320 arranged toward the housing 250, a repulsive force is generated.

Accordingly, when the permanent magnet 320 connected to the main cam 212 is moved by the repulsive force on the electromagnet 340, the shaft 230 connected to the permanent magnet 320 rotates. Accordingly, the main cam 212 moves in the direction "a" in FIG. 5 by the rotation of the shaft 230 to prevent the shift lever 100 from moving.

Then, when the power of the electromagnet 340 is turned off, no current flows through the electromagnet 340. If the current does not flow through the electromagnet 340, an attractive force is generated on a steel core 342 within the electromagnet 340 and the repulsive force acting on the magnet 340 disappears. Accordingly, the main cam 212 returns to its original position.

On the other hand, when the main cam 212 moves, the sub-cam 214 also moves by the spring 216 in the direction in which the main cam 212 moves.

The shift lock unit 200 may further include a sensor. The sensor senses the position of the main cam 212. The sensor transmits information on the sensed position of the main cam 212 to the control unit 400. On the basis of the information on the position of the main cam 212, the control unit 400 is able to determine the state of the shift lock cam part 210. Specifically, on the basis of the information on the position of the main cam 212, the control unit 400 is able to determine whether the shift lock cam part 210 of the shift lock unit 200 is in an open-state or is in a locked-state as shown in FIG. 5B.

The sensor may include a hall IC 312. The hall IC 312 senses a change of a magnetic force, and thus, can detect a distance between the sensor and the permanent magnet 320 mounted on one end of the main cam 212. The hall IC 312 may be mounted on a PCB 310.

Figure 1:
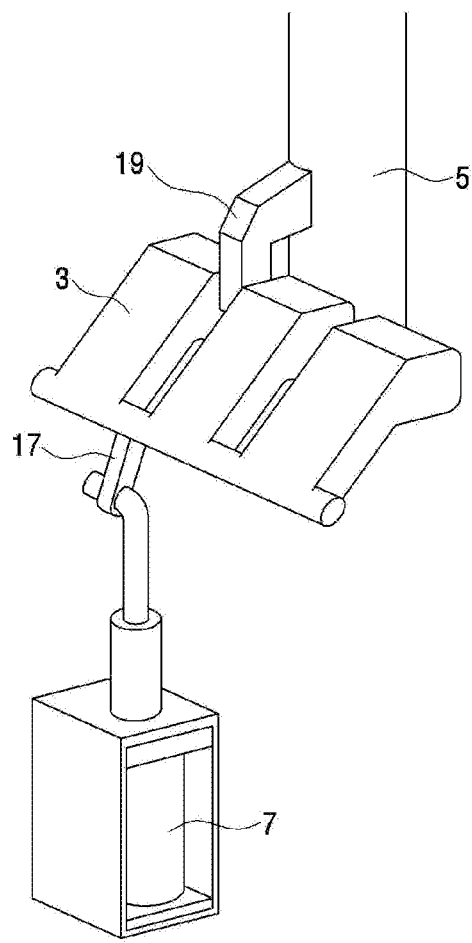
FIG. 1 shows an example of a conventional manual transmission.

When the shift lock unit 200 includes, as shown in FIGS. 1 to 3, two shift lock cam parts 210 and 220, the respective shift lock cam parts 210 and 220 may be operated independently of each other by the control unit 400.

The sensor may sense the shift lock cam parts 210 and 220 independently and transmit the sensed results to the control unit 400. In this case, two hall ICs 312 sensing the two shift lock cam parts 210 and 220 respectively may be disposed on the PCB 310 of the sensor.

Figure 8A:
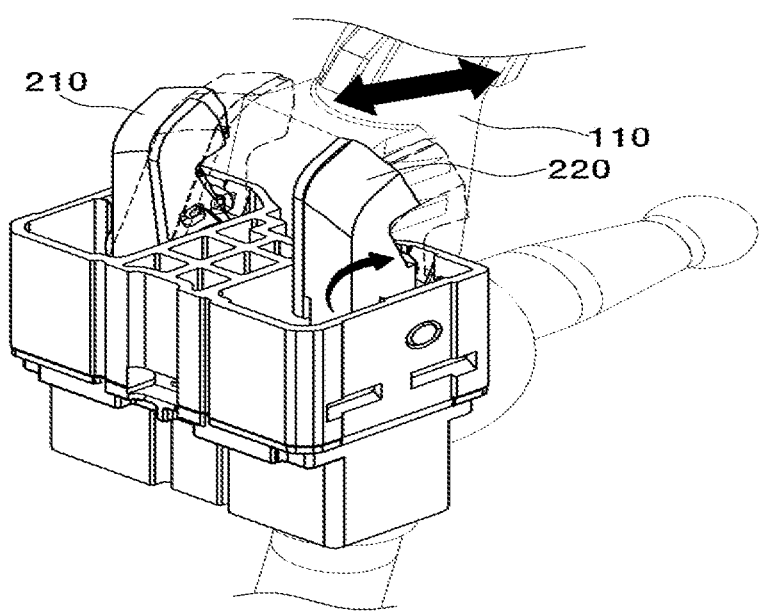
FIGS. 8A and 8B are views for describing the operation of a sub-cam of FIG. 7 according to an embodiment of the present disclosure.
Figure 8B:
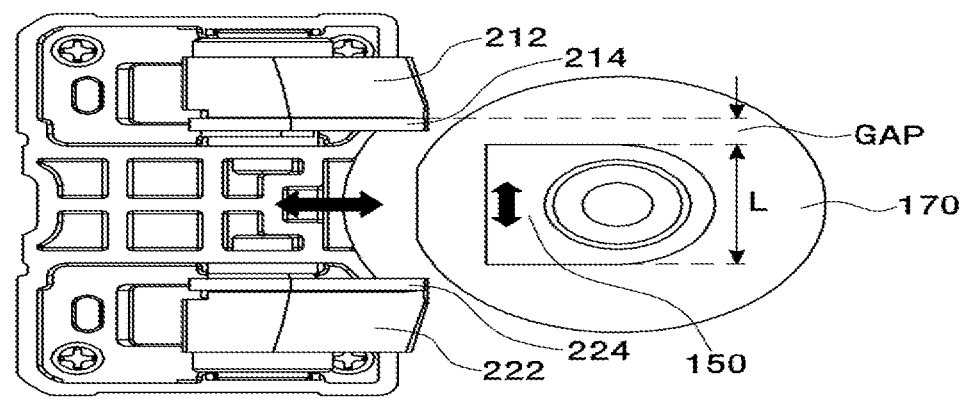

The operation of the sub-cam will be described with reference to FIGS. 8A and 8B. FIGS. 8A and 8B are views for describing the operation of the sub-cam of FIGS. 7A and 7B.

Referring to FIGS. 7A, 7B, 8A, and 8B, the shift lock cam parts 210 and 220 prevent the rod 110 of the shift lever 100 from moving in the direction of the first or second forward gear.

The shift lock cam parts 210 and 220 have a two-stage cam structure for adjusting the gap. Specifically, when the main cams 212 and 222 of the shift lock cam parts 210 and 220 are moved by the repulsive force between the permanent magnet 320 and the electromagnet 340, the main cams 212 and 222 are engaged with the stopper 150 of the shift lever 100. Here, there may be a gap between the main cams 212, 222 and the stopper 150. Therefore, the sub-cams 214 and 224 are disposed in order to absorb the gap between the main cams 212 and 222 and the stopper 150 when there is the gap between the main cams 212 and 222 and the stopper 150.

More specifically, in order to prevent the rod 110 of the shift lever 100 from moving in the direction of the first or second forward gear, the main cams 212 and 222 are engaged with the stopper 150 of the shift lever 100. Here, the position of the stopper 150 of the shift lever 100 may not be constant. Therefore, the sub-cams 214 and 224 are provided to correspond to the range of possible positions of the stopper 150 of the shift lever 100. The sub-cams 214 and 224 are disposed adjacent to the main cams 212 and 222 and disposed opposite to each other.

The sub-cams 214 and 224 are interlocked with the movement of the main cams 212 and 222 when the main cams 212 and 222 operate and return. The main cams 212 and 222 and the sub-cams 214 and 224 operate independently when the main cams 212 and 222 are engaged with the stopper 150 of the shift lever 100 and are prevented from moving.

The sub-cams 214 and 224 are also moved by the spring 216 in the direction in which the main cams 212 and 222 move. During the operation of the sub-cams 214 and 224, the sub-cams 214 and 224 move in the direction of the shift lever 100 to prevent the shift lever 100 from moving.

The control unit 400 controls the shift lock unit 200 by comparing the vehicle speed with a threshold speed of a predetermined gear. Here, information on the vehicle speed can be received from the electronic control unit 410.

The control unit 400 compares the speed of the vehicle with the critical speed of the predetermined gear. As a result of the comparison, if the speed of the vehicle is greater than the critical speed, the control unit 400 positions the shift lock unit 200 on the shift path of the predetermined gear, and limits the movement of the rod 110 in the shift direction of the predetermined gear.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. That is, the components described in detail in the embodiments of the present invention may be modified. Further, differences due to the modification and application should be construed as being included in the scope and spirit of the present invention, which is described in the accompanying claims.

What is claimed is:

1. A manual shift lever system comprising:
    a shift lever which comprises a rod and a stopper formed on the rod;
    a shift lock unit which limits a movement of the rod; and
    a control unit which, when a speed of a vehicle is greater than a critical speed of a predetermined gear by comparing the speed of the vehicle with the critical speed, limits the movement of the rod in a shift direction of the predetermined gear by positioning the shift lock unit on a shift path of the predetermined gear,
    wherein the shift lock unit comprises:
        at least one shift lock cam part comprising a main cam which is engaged with the stopper of the shift lever during the operation thereof, a sub-cam which is disposed adjacent to the main cam, a shaft which functions as a rotating shaft of the main cam and the sub-cam, and a spring which connects the main cam and the sub-cam;
        a permanent magnet which is connected to the shift lock cam part; and an electromagnet which is disposed adjacent to the permanent magnet and is arranged to have a polarity arrangement opposite to that of the permanent magnet, wherein:

when the main cam is moved, the sub-cam moves depending on the movement of the main cam, and the sub-cam absorbs a gap between the main cam and the stopper.

2. The manual shift lever system of claim 1, wherein the sub-cam has a thickness smaller than that of the main cam.

3. The manual shift lever system of claim 1, wherein the shift lock unit further comprises a sensor which senses a position of the main cam, and wherein the sensor transmits information on the sensed position of the main cam to the control unit.

4. The manual shift lever system of claim 1, wherein the shift lock unit further comprises a housing which seals the electromagnet.

5. The manual shift lever system of claim 4, wherein the shift lock unit further comprises a fixing portion for fixing the shaft.

6. A manual shift lever system comprising:

a shift lever which comprises a rod and a stopper formed on the rod;

a shift lock unit which limits a movement of the rod; and a control unit which, when a speed of a vehicle is greater than a critical speed of a predetermined gear by comparing the speed of the vehicle with the critical speed, limits the movement of the rod in a shift direction of the predetermined gear by positioning the shift lock unit on a shift path of the predetermined gear, wherein the shift lock unit comprises:

at least one shift lock cam part comprising a main cam which is engaged with the stopper of the shift lever during the operation thereof, a sub-cam which is disposed adjacent to the main cam, a shaft which functions as a rotating shaft of the main cam and the sub-cam, and a spring which connects the main cam and the sub-cam;

a permanent magnet which is connected to the shift lock cam part; and an electromagnet which is disposed adjacent to the permanent magnet and is arranged to have a polarity arrangement opposite to that of the permanent magnet, wherein the main cam has a protrusion formed on a side thereof, and wherein the sub-cam has an opening for receiving the protrusion.

7. The manual shift lever system of claim 6, wherein the shift lock cam part further comprises a spring support on which the spring is wound and which is coupled to the sub-cam, and wherein one end of the spring is connected to the protrusion of the main cam and the other end of the spring is wound on the spring support coupled to the sub-cam.

8. The manual shift lever system of claim 6, wherein the shift lock unit further comprises a sensor which senses a position of the main cam, and wherein the sensor transmits information on the sensed position of the main cam to the control unit.

9. The manual shift lever system of claim 6, wherein the shift lock unit further comprises a housing which seals the electromagnet.

10. The manual shift lever system of claim 9, wherein the shift lock unit further comprises a fixing portion for fixing the shaft.

11. The manual shift lever system of claim 6, wherein the sub-cam has a thickness smaller than that of the main cam.

* * * * *